US009491219B2

(12) United States Patent
Venkatasubramaniam et al.

(10) Patent No.: US 9,491,219 B2
(45) Date of Patent: Nov. 8, 2016

(54) MOBILE DEVICE PERCEPTIVE AUDIO AND VIDEO QUALITY ANALYSIS USING ONBOARD TEST SIGNALS

(71) Applicant: Cellco Partnership, Arlington, VA (US)

(72) Inventors: Gopinath Venkatasubramaniam, Bridgewater, NJ (US); Mauricio Pati Caldeira de Andrada, South Plainfield, NJ (US); Christopher M. Schmidt, Branchburg, NJ (US); Yuk Lun Li, Morganville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 710 days.

(21) Appl. No.: 13/926,671

(22) Filed: Jun. 25, 2013

(65) Prior Publication Data

US 2014/0379935 A1 Dec. 25, 2014

(51) Int. Cl.
*H04L 29/06* (2006.01)

(52) U.S. Cl.
CPC .................................... *H04L 65/80* (2013.01)

(58) Field of Classification Search
CPC ..... H04L 65/60; H04L 65/80; H04L 65/605; H04L 41/147; H04L 41/5067; H04L 43/08; H04W 24/06; H04W 28/16; H04W 88/02
USPC ........................................................ 709/231
See application file for complete search history.

(56) References Cited

U.S. PATENT DOCUMENTS

| 2013/0301810 A1* | 11/2013 | Dunne | H04L 65/80 379/32.01 |
| 2014/0016487 A1* | 1/2014 | Dorenbosch | H04W 24/06 370/252 |

OTHER PUBLICATIONS

ITU-T, Telecommunication Standardization Sector of ITU, "Objective Perceptual Multimedia Video Quality Measurement in the Presence of a Full Reference," Recommendation ITU-T J.247, Aug. 2008.
ITU-T, Telecommunication Standardization Sector of ITU, "Perceptual Objective Listening Quality Assessment," Recommendation ITU-T P.863, Jan. 2011.

* cited by examiner

*Primary Examiner* — Tu Nguyen (57) ABSTRACT

Techniques described herein may use perceptual quality measurement techniques to test and/or evaluate communication sessions between mobile devices. A method may include receiving, by a mobile device and as part of an audio or video call with a second mobile device, a streamed version of a reference audio or video file; and reading a version of the reference audio or video file that was previously stored locally to the mobile device. The method may further include calculating, based on a comparison of the streamed version of the reference audio or video file to the version of the reference audio video file that was stored locally, a perceptual quality score for the streamed version of the reference audio or video file.

20 Claims, 8 Drawing Sheets

MOBILE DEVICE PERCEPTIVE AUDIO AND VIDEO QUALITY ANALYSIS USING ONBOARD TEST SIGNALS

BACKGROUND

The quality of audio and video data may be measured in a number of ways. One technique for measuring the quality of audio and video is based on the goal of predicting the perceptual quality of the audio and/or video signal as if the audio and/or video signal is being evaluated (perceived) by a human. Ideally, the predictions of these objective measures should come as close as possible to subjective quality scores that are obtained in subjective listening tests.

Perceptual Objective Listening Quality Assessment (POLQA) is one technique to perceptually predict quality of speech. Similarly, Perceptual Evaluation of Video Quality (PEVQ) is another technique to perceptually predict quality of video. The POLQA and PEVQ techniques, in general, may compare an original version of a reference signal (e.g., an audio or video signal) and a received version (i.e., potentially noisy or corrupted version) of the reference signal. Based on the comparison, the POLQA and PEVQ techniques may determine a quality score for the received version of the signal. For example, the POLQA and PEVQ techniques may determine a Mean Opinion Score (MOS) for the received signal, which may range in value from one (poor quality) to five (excellent quality).

Perceptual quality measurement techniques, such as POLQA and PEVQ, may be useful when evaluating, tuning, and/or provisioning a communication network, such as a wireless network. It is desirable to use perceptual quality measurement techniques in a manner that is as efficient and cost-effective as possible.

DETAILED DESCRIPTION OF PREFERRED EMBODIMENTS

The following detailed description refers to the accompanying drawings. The same reference numbers in different drawings may identify the same or similar elements.

Techniques described herein may use perceptual quality measurement techniques, such as POLQA and PEVQ, to test and/or evaluate a communication network. The network may include a wireless network, such as a cellular wireless network. Mobile devices (such as mobile phones in the communication network) may internally store audio and video reference files. Additionally, the mobile devices may include application programming interfaces (APIs) through which an onboard diagnostic monitor (OBDM) application may control the transmission of the audio and video reference files in place of standard audio (e.g., audio received through a speaker of the mobile device) or video (e.g., video received through a camera of the mobile device). Perceptual quality measurement techniques may be applied based on transmitting, receiving, and comparing the reference files, to received versions of the reference files, without additional equipment that may otherwise be required (e.g., such as an external device or dedicated device that is used to inject the audio and video reference files into the network).

Figure 1:
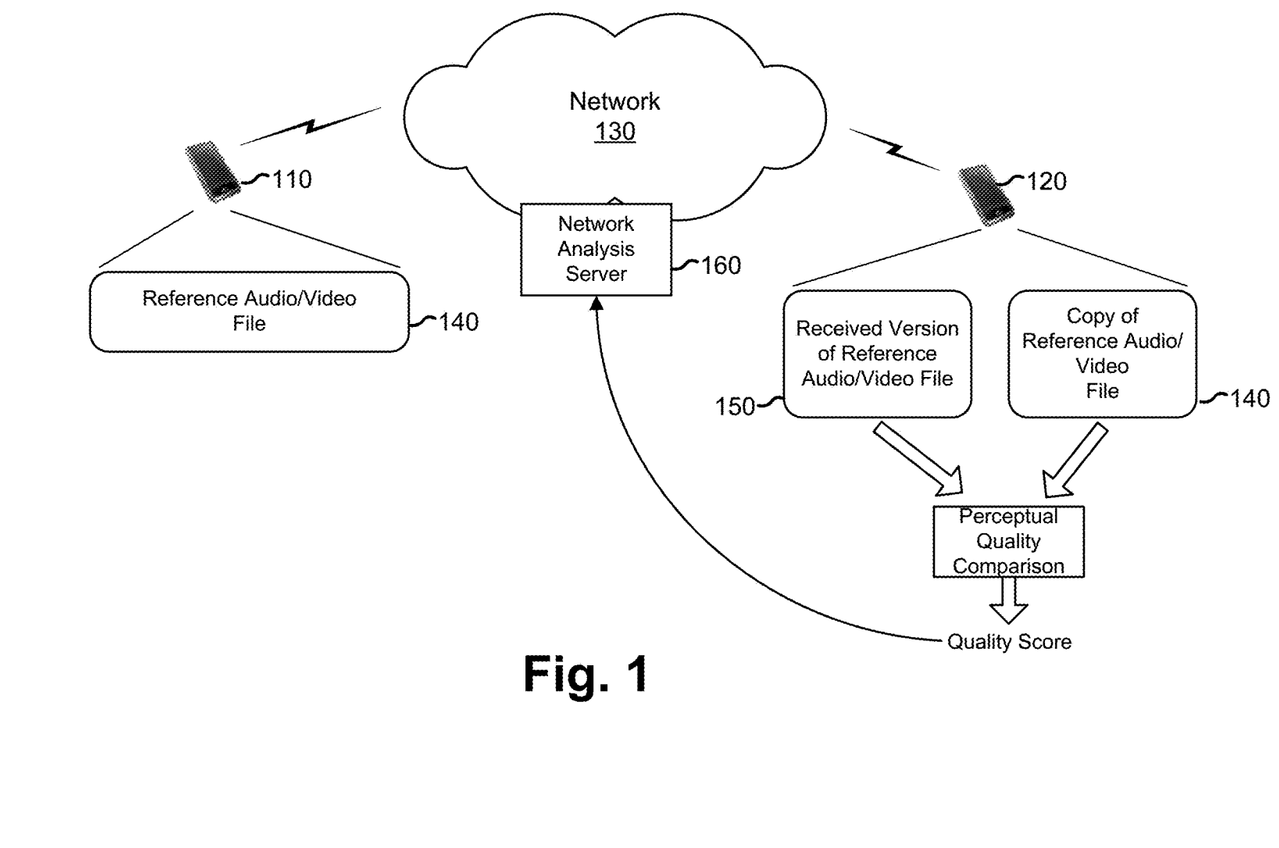
FIG. 1 is a diagram conceptually illustrating an example of an overview of concepts described herein.

FIG. 1 is a diagram conceptually illustrating an example of an overview of concepts described herein. As shown in FIG. 1, a first mobile device 110 may contact another mobile device 120, via network 130. For example, mobile device 110 and mobile device 120 may include cellular phones that are operated by administrators or technicians that are testing the performance of network 130. The technicians may place calls to one another from various locations associated with network 130.

Mobile device 110 and mobile device 120 may each include a reference audio/video file 140. The reference audio/video file 140 may be identical at each mobile device 110 and 120. Mobile device 110 may transmit reference audio/video file 140 over network 130. The received version of the reference audio/video file, file 150, as received by mobile device 120, may also be stored. Transmission of audio and video through network 130 may be noisy, and the amount of noise may depend on a number of factors, such as network congestion, the encoding/decoding schemes used to transmit the audio and video, and the quality of the radio links between the mobile devices and network 130. Accordingly, the received version of reference audio/video file 150 may not be identical to reference audio/video file 140.

Mobile device 120 may compare received version of reference audio/video file 150 to reference audio/video file 140 (using a perceptual quality comparison technique) to generate a quality score, such as a MOS. The quality score may be provided to network analysis server 160, which may perform analysis and/or aggregation functions relating to quality scores for network 130. In some implementations, mobile device 120, instead of generating a quality score, may transmit, using a lossless file transmission technique (e.g., non-streaming via ftp file transfer), the received version of reference audio/video file 150 to a network element, such as network analysis server 160, which may then generate the quality score.

Figure 2:
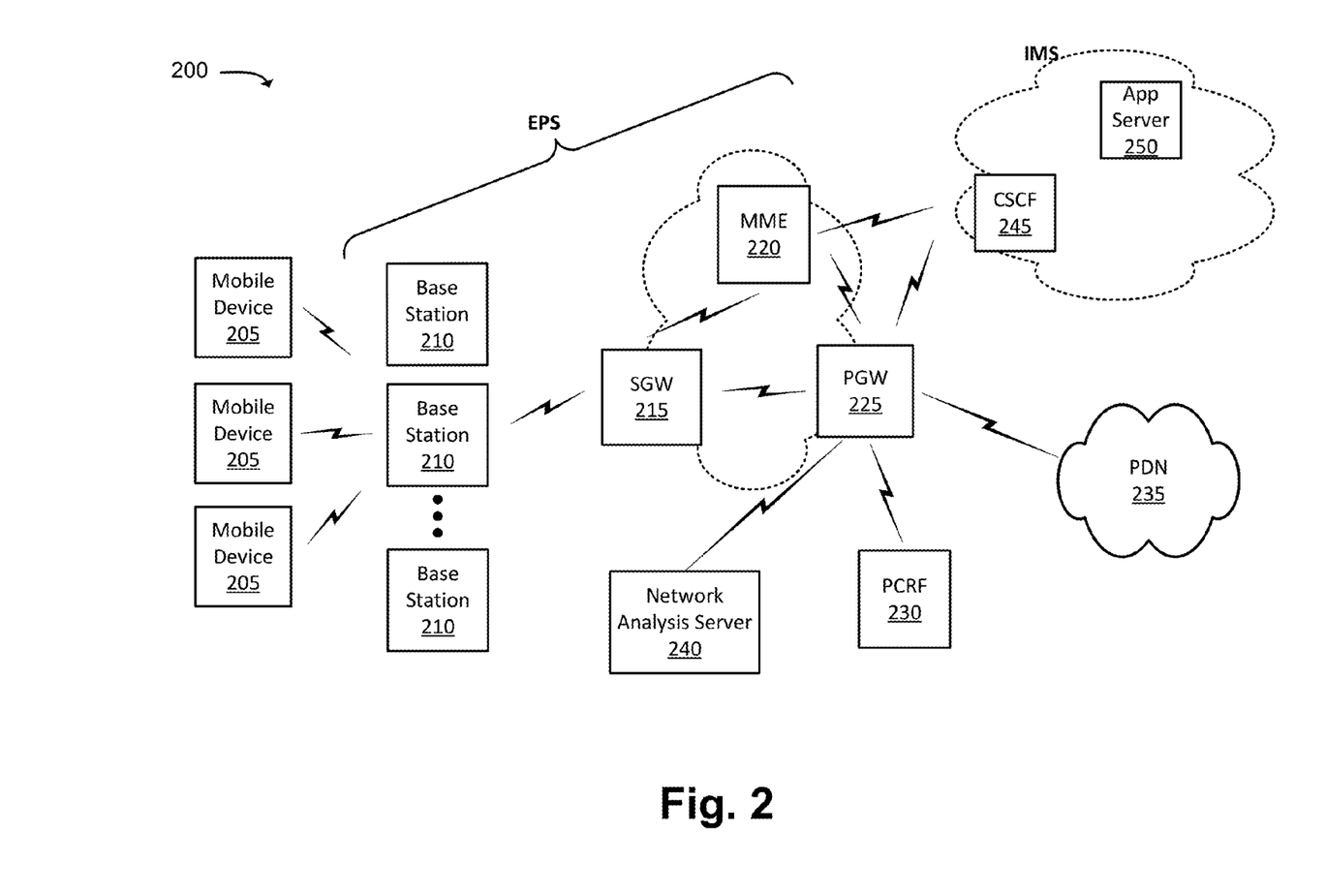
FIG. 2 illustrates an example environment in which systems and/or methods described herein may be implemented.

FIG. 2 illustrates an example environment 200 in which systems and/or methods described herein may be implemented. Environment 200 may represent a wireless communication system, such as a wireless network, in which voice and data sessions may be established. In one implementation, environment 200 may include an evolved packet system (EPS) that includes a LTE network based on a third generation partnership project (3GPP) wireless communication standard. Additionally, environment 200 may include an IP Multimedia Subsystem (IMS) architecture for delivering IP multimedia services. Voice calls in environment 200 may be implemented using the Voice over LTE (VoLTE) standard to provide voice calls over LTE and IMS.

As shown in FIG. 2, environment 200 may include one or more mobile devices 205 and base stations 210. In an LTE environment, base stations 210 may take the form of evolved node Bs (eNodeBs), and mobile devices 205 may be referred to as user equipment (UE). Environment 200 may further include serving gateway (SGW) 215, mobile management entity (MME) 220, packet data network gateway (PGW) 225, policy charging and rules function (PCRF) 230, a packet data network (PDN) 235, and a network analysis server 240. The IMS portion of environment 200 may include call session control function (CSCF) 245 and application (App) server 250.

Mobile devices 205 may include any computation and communication device, such as a wireless mobile communication device that is capable of communicating with base stations 210 over a radio (i.e., wireless) interface. For example, a mobile device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device.

Base stations 210 may include one or more network devices that receive, process, and/or transmit traffic, such as calls, audio, video, text, and/or other data, destined for and/or received from mobile device 205. Base stations 210 and mobile devices 205 may communicate over radio interfaces to form a radio access network (RAN) for environment 200. Base stations 210 may receive traffic from and/or send traffic to PDN 235 via SGW 215 and PGW 225.

Base stations 210 may be physically located to provide cellular coverage to mobile devices 205, such that a mobile device 205 may seamlessly move out of range of one base station 210 and into range of another base station 210. Each base station 210 may simultaneously provide radio connectivity to multiple mobile devices 205.

SGW 215 may include one or more computation and communication devices that route and forward user data packets. SGW 215 may route and forward user packets and also act as a mobility anchor during inter-base station handoffs.

MME 220 may include one or more computation and communication devices that perform signaling in environment 200. MME 220 may, for example, be responsible for authenticating mobile devices 205, maintaining location information for mobile devices 205, and selecting a PGW 225 to service a particular mobile device 205. MME 220 may also operate to establish bearer channels associated with a session with mobile device 205, to hand off mobile device 205 from the EPS to another network, to hand off mobile device 205 from the other network to the EPS, and/or to perform other operations. MME 220 may perform policing operations on traffic destined for and/or received from mobile device 205.

PGW 225 may include one or more network devices, or other types of computation and communication devices, that gather, process, search, store, and/or provide information in a manner described herein. For instance, PGW 225 may aggregate traffic received from one or more SGWs 215, etc. and may send the aggregated traffic to PDN 235 and/or to another network. PGW 225 may also, or alternatively, receive traffic from PDN 235 and/or another network, and may send the traffic toward mobile device 205 via SGW 215 and/or base station 210. PGW 225 may also act as an interface for the IMS portion of environment 200.

PCRF 230 may include one or more server devices, or other types of devices, that aggregate information to and from the EPS network and/or other sources. PCRF 230 may receive information regarding policies and/or subscriptions from one or more sources, such as subscriber databases and/or from one or more users (such as, for example, an administrator associated with PCRF 230).

PDN 235 may include one or more wired and/or wireless networks. For example, PDN 235 may include an Internet Protocol (IP) based PDN. PDN 235 may include, for example, a wide area network such as the Internet, or one or more other networks. Mobile device 205 may connect, through PGW 225, to data servers, application servers, or to other servers/applications that are coupled to PDN 235.

Network analysis server 240 may represent one or more computing devices that may perform analysis, aggregation, and/or optimization functions relating to environment 200. For example, network analysis server 240 may receive perceptual quality measurements from one or more user devices 205. Network analysis server 240 may use the received perceptual quality measurements to perform analysis, monitoring, and/or optimization functions. For example, a network administrator may use the perceptual quality measurements to adjust parameters in base station 210, SGW 215, MME 220, and/or PGW 225. In some implementations, instead of (or in addition to) receiving perceptual quality measurements from mobile devices 205, network analysis server 240 may receive a copy of the received version of a reference audio/video file, and then may calculate the perceptual quality measurements.

CSCF 245 may include one or more computation and communication devices that process session initiation protocol (SIP) signaling, in environment 200, for IMS related services, such as VoLTE, video services, or other services. CSCF 245 may represent functionality associated with a proxy-CSCF (P-CSCF) and/or a serving-CSCF (S-CSCF). With respect to the functionality of the P-CSCF, CSCF 245 may act as a SIP proxy that is the first point of contact for an IMS communication and may include a Policy Decision Function (PDF), which may authorize media plane resources e.g., quality of service (QoS) over the media plane. With respect to the functionality of the S-CSCF, CSCF 245 may act as the central node of the signaling plane for IMS services. CSCF 245 may provide routing services and determine to which application servers particular SIP messages will be forwarded.

Application server 250 may include one or more computation and communication devices that provide support for VoLTE and Rich Communication Services (RCS) related services. In addition to support for VoLTE calls, application server 255 may, for instance provide support for an instant messaging, chat, video sharing, file transfer, and image transfer.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections. Additionally, although an LTE-based network is particularly illustrated and discussed with reference to FIG. 2, in other implementations, other network technologies may alternatively be used.

Figure 3:
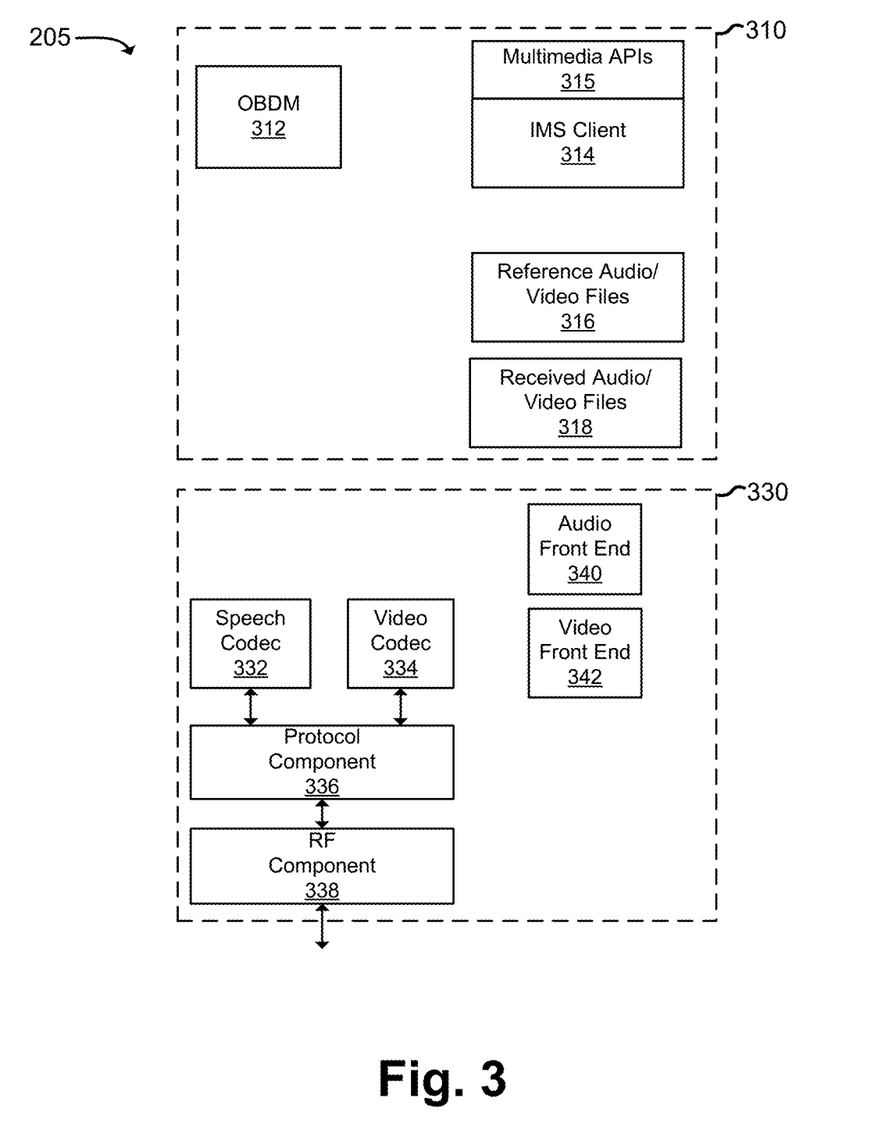
FIG. 3 is a diagram illustrating an example of functional elements in a mobile device.

FIG. 3 is a diagram illustrating an example of functional elements in a mobile device 205. As illustrated, mobile device 205 may include an application portion 310 and a baseband portion 330. Application portion 310 may generally include application-level functionality associated with the operation of mobile device 205 and baseband portion 330 may generally include functionality associated with lower level processing of audio and video signals (e.g., codec encoding/decoding, protocol processing, and radio transmission).

As illustrated, application portion 310 may include on-board diagnostic monitor (OBDM) 312, IMS client 314, reference audio/video file(s) 316, and received audio/video file(s) 318. OBDM 312 may include an application to provide diagnostic and/or monitoring services for mobile device 205. OBDM 312 may, for example, monitor the operation of one or more other applications and/or communication sessions that are provided by mobile device 205. OBDM 312 may store results of the operation of the one or more other applications and/or communication sessions, and may potentially transmit the results to network analysis server 240.

IMS client 314 may include an application that provides the IMS related functionality of mobile device 205. IMS client 314 may, for example, perform the client-side functionality for the IMS-based services that are offered by mobile device 205. IMS client 314 may, for example, handle IMS signaling, audio calls (e.g, via VoLTE), video calls, messaging, chat, and presence. Consistent with aspects described herein, IMS client 214 may include APIs 315 that may be accessible by OBDM 312 and may be used to direct IMS client 314 to use reference audio/video file(s) 316 (e.g., in place of a normal audio or video input stream) when implementing an audio or video call with another device (e.g., another mobile device 205).

Reference audio/video files 316 may include the audio and video files that are to be used to perform perceptual quality measurements. Reference audio/video files 316 may be unencoded (raw) audio/video files that will be encoded by speech codec 332 (for audio) or video codec 334 (for video) before being transmitted from mobile device 205. Reference audio/video files 316 may be stored locally at mobile device 205. For example, reference audio/video files 316 may be downloaded from network analysis server 240, installed during manufacture of mobile device 205, and/or installed during a software update to mobile device 205.

Received audio/video files 318 may include audio and/or video files that have been received, such as from another mobile device 205, as part of perceptual quality measurements. The received audio/video files 318 may be stored as a corresponding audio or video stream that is received by device 205. As previously mentioned, the audio or video streams received by device 205 may include noise that is introduced into the stream during the transcoding or transmission of the audio or video stream. Accordingly, received audio/video files 318 may not be identical to the version of the audio/video file that is transmitted by the sending mobile device.

As is further illustrated in FIG. 3, baseband portion 330 may include speech codec 332, video codec 334, protocol component 336, radio frequency (RF) component 338, audio front end 340, and video front end 342. Speech codec 332 may include logic to implement a speech coding/decoding technique. For example, speech codec 332 may implement a wideband speech coding using, for example, the adaptive multi-rate wideband (AMR-WB) technique. In other implementations, other audio codecs may alternatively or additionally be used.

Video codec 334 may include logic to implement a video coding/decoding technique. For example, video codec 334 may implement the H.264/MPEG-4 standard. In other implementations, other video codecs may alternatively or additionally be used.

Protocol component 336 may implement one or more network protocols relating to the transmission of audio or video data over a network. Protocol component 336 may, for example, from a transmitting perspective, operate to transmit the audio/video streams as a series of packets using RF component 338. In the context of the receiving of an audio/video stream, protocol component 336 may receive packets from RF component 338, extract a stream of audio/video data from the received packets, and transmit the stream to speech codec 332 or video codec 334. Protocol component 336 may implement protocols such as the IP, real-time transport protocol (RTP), and user datagram protocol (UDP).

Audio front end 340 may include logic to receive audio from or provide audio to the user of mobile device 205. Audio front end 340 may include, for example, a speaker, a microphone, and circuitry to provide an electrical interface with the speaker and/or microphone. Video front end 342 may similarly include logic to receive video from or transmit video to the user of mobile device 205. Video front end 340 may include, for example, a camera, and circuitry to provide an electrical interface with the camera.

Although FIG. 3 illustrates example components of mobile device 205, in other implementations, mobile device 205 may contain fewer components, different components, differently arranged components, or additional components than those depicted. Alternatively, or additionally, one or more components of mobile device 205 may perform one or more other tasks described as being performed by one or more other components of mobile device 205.

Figure 4:
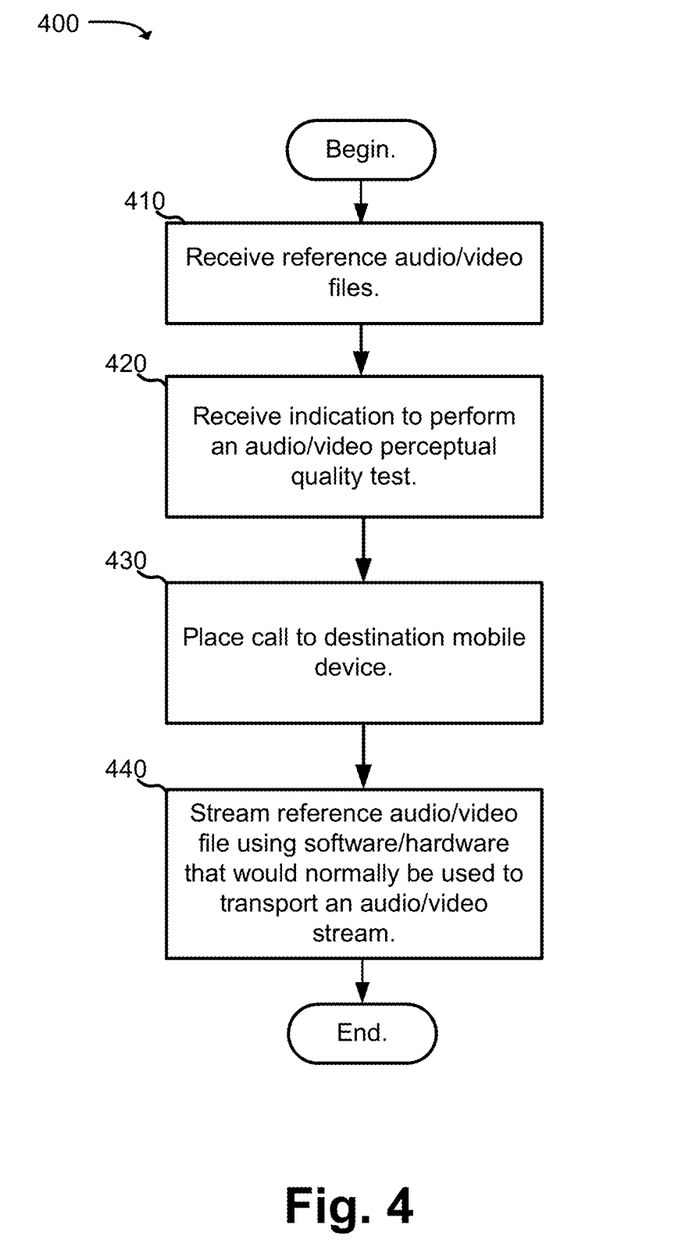
FIG. 4 is a flow chart illustrating an example process for performing perceptual quality tests for audio and/or video calls in a network.

FIG. 4 is a flow chart illustrating an example process 400 for performing perceptual quality tests for audio and/or video calls in a network. Process 400 may be implemented by, for example, one of mobile devices 205 and is illustrated from the perspective of a mobile device 205 that transmits a reference audio/video stream.

Process 400 may include receiving reference audio/video files (block 410). For example, reference audio/video files 316 may be downloaded, by mobile device 205, from network analysis server 240, installed during manufacture of mobile device 205, and/or installed during a software update to mobile device 205. In one implementation, the reference audio/video files may be files that are to be tested using the POLQA or PEVQ perceptual quality testing techniques.

Process 400 may further include receiving an indication to perform an audio/video perceptual quality test (block 420). For example, a user, such as a network administrator or technician, may transport mobile device 205 to an area that is to be tested as an endpoint for a perceptual quality test (e.g., within a coverage area of a particular base station). Through an interface associated with mobile device 205, such as a graphical interface presented by mobile device 205, the user may indicate that a perceptual quality test is to performed (e.g., the user may initiate the perceptual quality test). The user may also enter information (e.g., a telephone number) identifying the other endpoint (e.g., the receiving mobile device 205) that is to be part of the perceptual quality test.

Process 400 may further include placing a call to a destination mobile device (block 430). The call may be placed in response to the indication to perform the audio/video perceptual quality tests. The call may be, for example, a streaming audio or video call.

Process 400 may further include streaming the reference audio/video file using software and/or hardware, associated with the mobile device, that would normally be used to transport an audio/video stream (block 440). For example, for a reference audio file, mobile device 205 may read the locally stored reference audio file and transmit the file by encoding the file with speech codec 332 before transmitting the file as an audio stream via RF component 338. The internal processing, by mobile device 205, to transmit the reference audio file, may be generally identical to processing performed when transmitting an audio call from a user, except that instead of receiving the audio information through audio front end 340, the audio information is read from the reference audio file. Similarly, for a reference video file, mobile device 205 may read the locally stored reference video file and transmit the file by encoding the video part of the file with video codec 334 and the audio portion with audio codec 332 before transmitting the file as a stream (or multiple streams) via RF component 338. The internal processing, by mobile device 205, to transmit the reference video file, may be generally identical to processing performed when transmitting a video call from a user, except that instead of receiving the video information through video front end 342, the video information is read from the reference video file.

In one implementation, to stream the reference audio/video file using the software/hardware that would normally be used to transport audio/video stream, OBDM 312 may initiate the streaming via calls to multimedia APIs 315 that are implemented by IMS client 314. The calls may cause IMS client 314 to use one of reference audio/video files 316 as a source file instead of a normal audio/video stream.

Figure 5:
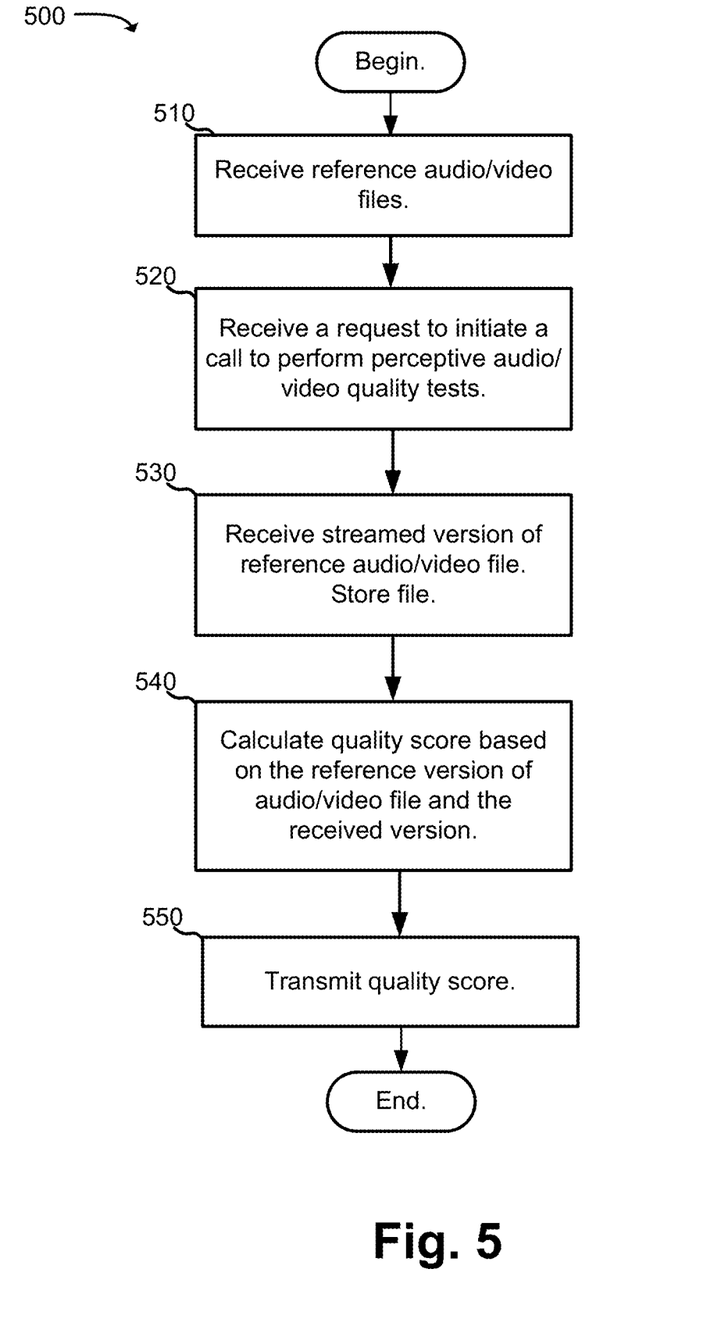
FIG. 5 is another flow chart illustrating an example process for performing perceptual quality tests for audio and/or video calls in a network.

FIG. 5 is a flow chart illustrating an example process 500 for performing perceptual quality tests for audio and/or video calls in a network. Process 500 may be implemented by, for example, one of mobile devices 205 and is illustrated from the perspective of a mobile device 205 that receives an audio/video stream.

Process 500 may include receiving the reference audio/video files. Reference audio/video files 316 may be received similarly to the reception of the audio/video files in block 410 (FIG. 4). For example, reference audio/video files 316 may be downloaded, by mobile device 205, from network analysis server 240, installed during manufacture of mobile device 205, and/or installed during a software update to mobile device 205.

Process 500 may further include receiving a request to initiate a call to perform perceptive audio/video quality test (block 520). In one implementation, the received call may be a call from another mobile device, such as a call initiated pursuant to block 430 and FIG. 4. A user, such as a network technician, may have indicated, such as to OBDM 312 that an audio/video quality test is about to be initiated. Alternatively or additionally, signaling information associated with the incoming call may indicate that the call is one in which an audio/video quality test is to be performed. In this situation, the signaling may also indicate the particular reference audio or video file that is to be transmitted as part of the test. In some implementations, the receiving mobile device may initiate the call with the mobile device that uploads the audio/video reference files.

Process 500 may further include receiving the streaming version of the reference audio/video file (block 530). The received signal may be stored (block 530), such as by storing the streamed information as received audio/video file 318. The incoming audio/video stream may be processed using software and/or hardware, associated with the mobile device, that would normally be used to receive an audio/video stream, however, instead of or in addition to outputting the stream to a speaker and/or display, the stream may be stored as received audio/video file 318.

Process 500 may further include calculating the quality score based on the reference version of the audio/video file and the received version (block 540). The quality score may be a perceptual-based quality score, such as one calculated using the POLQA or PEVQ techniques. The quality score may generally be calculated, using these techniques, based on a comparison of the reference version of the audio/video file to the received version. The quality score may be output as a numerical value, such as a value between one (poor quality) and five (excellent quality).

Process 500 may further include transmitting the quality score to network analysis server 160 (block 550). In some implementations, in addition to the quality score, other information, such as information identifying the endpoints of the call, or other information relating to the network over which the call was placed, may also be transmitted to network analysis server 160. As will be discussed more detail below, network analysis server 160 may store results relating to a number of perceptual quality tests. The results may be analyzed in order to provision, optimize, and/or otherwise adjust the network over which calls are transmitted.

Figure 6:
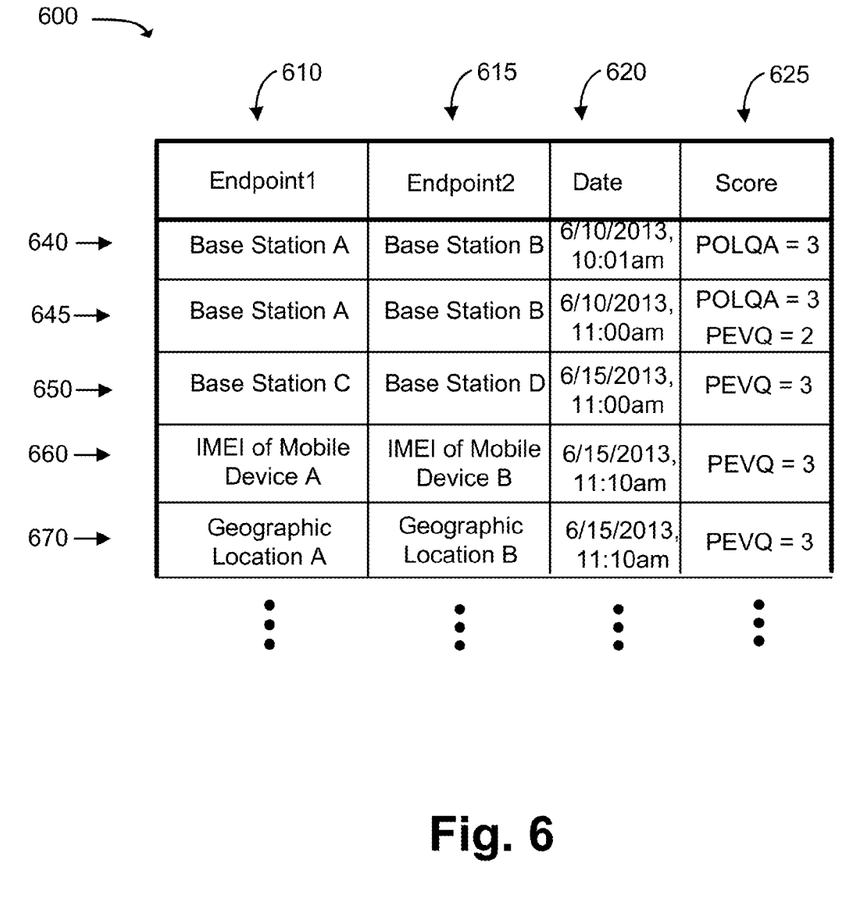
FIG. 6 is a diagram illustrating an example data structure, such as a data structure that may be maintained by a network analysis server.

FIG. 6 is a diagram illustrating an example data structure 600, such as a data structure that may be maintained by network analysis server 240. Data structure 600 may generally be used to store the quality scores generated as a result of the perceptual quality tests (e.g., as transmitted in block 550).

As illustrated, data structure 600 may include a number of fields, including: endpoint1 field 610, endpoint2 field 615, date field 620, and score 625. Each record in data structure 600, corresponding to one set of fields 610-625, may represent the result of one perceptual quality test. The fields shown for data structure 600 are examples. In alternative possible implementations, different, fewer, or additional fields may be implemented.

Endpoint1 field 610 and endpoint2 field 615 may each include one or more values that identify the respective endpoints of the voice or video call that was tested. In one implementation, endpoints fields 610 and 615 may include geographic information representing a location of the devices (e.g., the mobile devices) that participated in the test. Alternatively or additionally, endpoint fields 610 and 615 may include information that identifies network elements involved in the voice or video call that was tested. In yet another possible medication, endpoint fields 610 and 615 may include telephone numbers of the mobile devices that participated in the test and/or other identification information corresponding to the mobile devices that participated in the test (e.g., an International Mobile Station Equipment Identity (IMEI) value).

Date field 620 may include an indication of the date and/or time at which the test was performed. Score field 625 may store the quality score generated as a result of each perceptual quality test. For a perceptual-based MOS score, for example, score field 625 store a value between one (poor quality) and five (excellent quality).

Three example records, corresponding to three perceptual quality tests, are particularly illustrated in FIG. 6. The first record, record 640, may correspond to a perceptual quality test between a mobile device attached to a first base station (field 610), labeled as base station A, and a second base station (field 615), labeled as base station B. The perceptual quality test may have been performed on Jun. 10, 2013, at 10:01 am (field 620), and resulted in a quality score of POLQA=3 (field 625), which may indicate that the perceptual quality test may have been an audio only test and resulted in a POLQA score of 3. Record 645 may similarly indicate a quality test between mobile devices attached to base station A and base station B, performed on Jun. 10, 2013, at 11:00 am, and which resulted in quality scores of POLQA=3 and PEVQ=2 (e.g., indicating that the perceptual quality tests may have been an audio test, score=3, and a video test, score=2). Record 650 may similarly indicate a quality test between mobile devices attached to base station C and base station D, performed on Jun. 15, 2013, at 11:00 am, and which resulted in the quality score of PEVQ=4 (e.g., indicating that the perceptual quality test may have been a video test with a score=4). Record 660 may similarly indicate a quality test between mobile devices, such as two mobile devices identified by the corresponding IMEI values. In record 670, instead of identifying particular base stations or mobile devices for a test, a test may be identified by the geographic locations corresponding to the endpoints.

Figure 7:
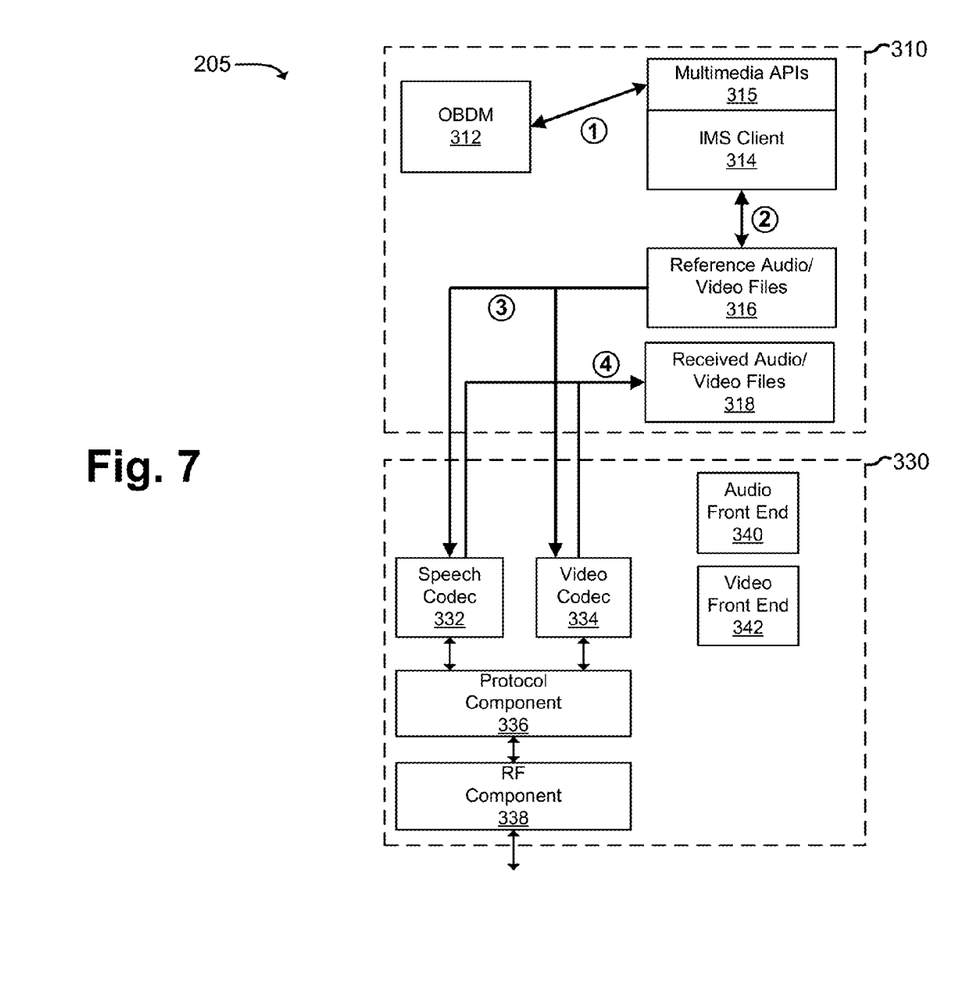
FIG. 7 is a diagram conceptually illustrating an example of operations performed by a mobile device.

FIG. 7 is a diagram conceptually illustrating an example of operations performed by a mobile device 205. FIG. 7 includes the functional elements illustrated in FIG. 3 for mobile device 205. In FIG. 7, however, signaling between functional elements is additionally illustrated by numbers circumscribed within circles.

As shown in FIG. 7, to initiate a quality test, OBDM 312 may make a call to multimedia APIs 315 (signal (1)), indicating that reference audio/video file 316 should be used as the source of media transmission instead of the camera or microphone of the mobile device. As an example, the call to multimedia APIs 315 may include an indication of the particular reference files that are to be used for the quality test. If the file is a video file, that includes both audio and video, the audio and video contents may be separately extracted and encoded by speech codec 332 and video codec 334, respectively.

IMS client 314 may access the reference audio/video files (signal (3)). IMS client 314 may also disable audio front end 340 (e.g., the microphone of mobile device 205) and video front and 342 (e.g., the camera of mobile device 205). The reference audio/video files 316 can be used as inputs to speech codec 332 and video codec 344, respectively (signal (3)).

During downlink operation (e.g., when receiving audio/video during a quality test), the received audio/video files may be recorded on the mobile device (signal (4)). OBDM 312 may use the recorded audio/video files 318 for comparison with reference audio/video files 316 to determine the quality scores.

As described above, mobile devices may implement perceptual quality measurement techniques, such as POLQA and PEVQ, to test and/or evaluate a communication network, without requiring additional devices to inject reference audio/video information through the network. Accordingly, the cost and ease with which network tests may be conducted, may be increased.

Figure 8:
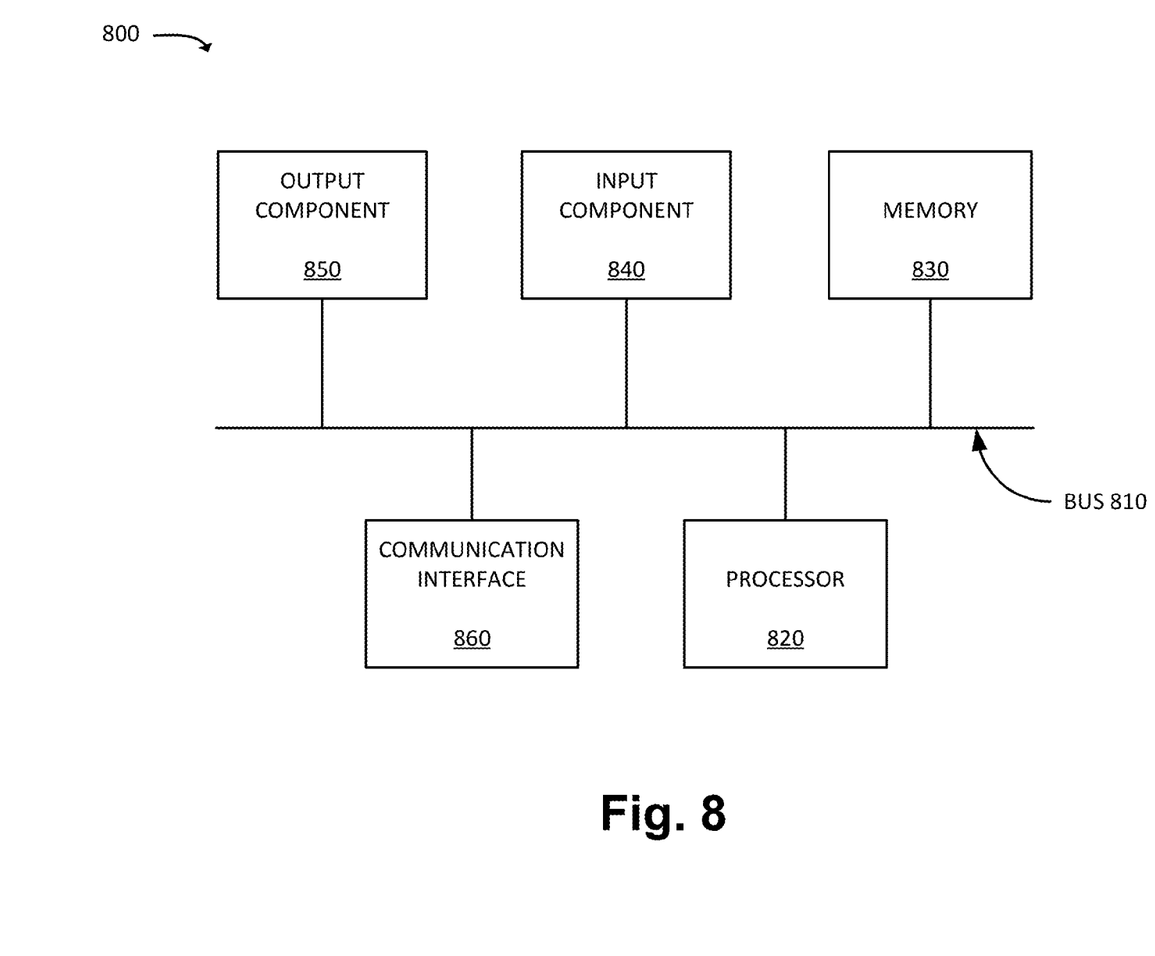
FIG. 8 is a diagram of example components of a device.

FIG. 8 is a diagram of example components of a device 800. Each of the devices illustrated in FIGS. 1 and 2 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by a mobile device, an indication to perform a perceptual quality test between the mobile device and a second mobile device;
   placing, by the mobile device, a voice or video call with the second mobile device, the voice or video call being associated with one or more codecs used to encode and decode audio or video associated with the voice or video call, respectively;
   reading, by the mobile device and based on receiving the indication, an audio or video reference file stored locally on the mobile device, wherein reading the reference file further includes:
   issuing, by an onboard diagnostic monitor (OBDM) application, a call to an application programming interface (API) of an IP Multimedia Subsystem (IMS) client of the mobile device, the call to the API causing the IMS client of the mobile device to use the reference file, when placing an audio or video call, in place of content acquired through a microphone or camera of the mobile device; and
   streaming, by the mobile device, the reference file to the second mobile device for the determination of a perceptual quality score relating to the perceptual quality test, the perceptual quality score being calculated based on a comparison of the reference file and the streamed version of the reference file, as received by the second mobile device.

2. The method of claim 1, further comprising:
   encoding the reference file, before streaming the reference file, using the one or more codecs.

3. The method of claim 2, wherein the one or more codecs include an adaptive multi-rate wideband (AMR-WB) codec and a H.264/MPEG-4 codec.

4. The method of claim 1, further comprising:
   receiving, by the mobile device, an audio or video file streamed from a third mobile device; and
   calculating, based on a comparison of the audio or video file streamed from the third mobile device to the reference file, a second perceptual quality score, relating to a network link between the mobile device and the third mobile device.

5. The method of claim 4, further comprising:
   transmitting the second perceptual quality score to a network analysis server.

6. The method of claim 1, wherein the perceptual quality score is determined based on a Perceptual Objective Listening Quality Assessment (POLQA) technique or a Perceptual Evaluation of Video Quality (PEVQ) technique.

7. The method of claim 1, wherein the OBDM indicates a particular reference file to use, of a plurality of possible reference files, in the call to the API, and wherein each of the reference files include unencoded raw audio or video files.

8. A mobile device comprising:
   a memory; and
   at least one processor to execute instructions in the memory to:
   receive an indication to perform a perceptual quality test between the mobile device and a second mobile device;
   place a voice or video call with the second mobile device, the voice or video call being associated with one or more codecs used to encode and decode audio or video associated with the voice or video call, respectively;
   read, based on the received indication, an audio or video reference file stored locally on the mobile device, wherein reading the reference file further includes:
   issuing, by an onboard diagnostic monitor (OBDM) application, a call to an application programming interface (API) of an IP Multimedia Subsystem (IMS) client of the mobile device, the call to the API causing the IMS client of the mobile device to use the reference file, when placing an audio or video call, in place of content acquired through a microphone or camera of the mobile device; and
   stream the reference file to the second mobile device for the determination of a perceptual quality score relating to the perceptual quality test, the perceptual quality score being calculated based on a comparison of the reference file and the streamed version of the reference file, as received by the second mobile device.

9. The mobile device of claim 8, wherein the at least one processor is further to execute instructions in the memory to:
   encode the reference file, before streaming the reference file, using the one or more codecs.

10. The mobile device of claim 9, wherein the one or more codecs include an adaptive multi-rate wideband (AMR-WB) codec and a H.264/MPEG-4 codec.

11. The mobile device of claim 8, wherein the at least one processor is further to execute instructions in the memory to:
    receive an audio or video file streamed from a third mobile device; and
    calculate, based on a comparison of the audio or video file streamed from the third mobile device to the reference file, a second perceptual quality score, relating to a network link between the mobile device and the third mobile device.

12. The mobile device of claim 11, wherein the at least one processor is further to execute instructions in the memory to:
    transmit the second perceptual quality score to a network analysis server.

13. The mobile device of claim 8, wherein the perceptual score is determined based on a Perceptual Objective Listening Quality Assessment (POLQA) technique or a Perceptual Evaluation of Video Quality (PEVQ) technique.

14. The mobile device of claim 8, wherein the OBDM indicates a particular reference file to use, of a plurality of possible reference files, in the call to the API, and wherein each of the reference files include unencoded raw audio or video files.

15. A method comprising:
   receiving, by a mobile device and as part of an audio or video call with a second mobile device, a streamed version of a reference audio or video file;
   reading, by the mobile device, a version of the reference audio or video file that was previously stored locally to the mobile device;
   calculating, by the mobile device and based on a comparison of the streamed version of the reference audio or video file to the version of the reference audio video file that was stored locally, a perceptual quality score for the streamed version of the reference audio or video file;
   receiving, by the mobile device, an indication to perform a perceptual quality test between the mobile device and a third mobile device;
   reading, by the mobile device and based on receiving the indication, the reference audio or video file that was previously stored locally to the mobile device, wherein reading the reference file further includes:
      issuing, by an onboard diagnostic monitor (OBDM) application, a call to an application programming interface (API) of an IP Multimedia Subsystem (IMS) client of the mobile device, the call to the API causing the IMS client of the mobile device to use the reference file, when placing an audio or video call, in place of content acquired through a microphone or camera of the mobile device; and
   streaming, by the mobile device, the reference file to the third mobile device for the determination of a second perceptual quality score.

16. The method of claim 15, wherein the perceptual score is determined based on a Perceptual Objective Listening Quality Assessment (POLQA) technique or a Perceptual Evaluation of Video Quality (PEVQ) technique.

17. The method of claim 16, wherein the perceptual score includes a Mean Opinion Score (MOS) having a value between one and five.

18. The method of claim 15, further comprising:
   encoding the version of the reference audio or video file that was stored locally using one or more codecs that are used by the mobile device when connecting a voice or video call.

19. The method of claim 15, further comprising:
   transmitting the perceptual quality score to a network analysis server.

20. The method of claim 15, wherein the OBDM indicates a particular reference file to use, of a plurality of possible reference files, in the call to the API, and wherein each of the reference files include unencoded raw audio or video files.

* * * * *